United States Patent Office 3,530,104
Patented Sept. 22, 1970

3,530,104
VINYL CHLORIDE COPOLYMERS
Elliott Farber, Trenton, and Marvin Koral, Warren, N.J., assignors to Tenneco Chemicals, Inc., a corporation of Delaware
No Drawing. Filed Sept. 15, 1967, Ser. No. 668,219
Int. Cl. C08f 15/40
U.S. Cl. 260—80.81                            6 Claims

ABSTRACT OF THE DISCLOSURE

The rate of polymerization of vinyl chloride-vinyl alkanoate monomer mixtures can be controlled by incorporating in the mixtures a small amount of a long chain $\alpha$-olefin. The resulting polymers have excellent heat stability and processing characteristics. A terpolymer prepared from a monomer mixture containing 85 percent to 94 percent of vinyl chloride, 5 percent to 10 percent of vinyl acetate and 0.5 percent to 3 percent of octadecene-1 has an unusually valuable combination of properties.

This invention relates to vinyl chloride copolymers and to a method for their production. More particularly, it relates to a method for the production of vinyl chloride copolymers in which a long chain $\alpha$-olefin is used to control the rate of polymerization of the monomer mixtures and to the production by this method of polymers that are characterized by excellent heat and light stability, good processability and other valuable properties.

When vinyl chloride is copolymerized with a vinyl alkanoate, the rate at which polymerization takes place generally increases with time. This autoacceleration of the polymerization rate, which has been attributed to polymerization of monomer within the precipitated polymer particles where the usual free radical termination reactions are inhibited, poses a serious problem in the commercial production of vinyl chloride-vinyl alkanoate copolymers. As the degree of autoacceleration increases, the polymerization rate and the evolution of heat by the exothermic polymerization reaction also increase. Because of the increased evolution of heat and because the ability of the system to dissipate heat rapidly is considerably decreased by the presence of sizeable amounts of precipitated polymer in the reactor, the cooling capacity of the system must be greatly expanded when there is the likelihood that autoacceleration of the polymerization rate will occur in order to maintain the reaction mixture at the constant reaction temperature that is necessary if a uniform product is to be obtained.

In accordance with the present invention, it has been found that the tendency of vinyl chloride-vinyl alkanoate mixtures to undergo autoaccelerated polymerization reactions can be substantially reduced by incorporating in the monomer mixtures a small amount of a long chain $\alpha$-olefin. The terpolymers obtained by polymerizing vinyl chloride with a vinyl alkanoate in the presence of a long chain $\alpha$-olefin have excellent heat stability, good processability, and other valuable properties. Their rheological properties are similar to those of copolymers containing about the same amounts of vinyl chloride and vinyl alkanoate.

While the presence of a small amount of a long chain $\alpha$-olefin will improve the polymerization characteristics and the properties of a wide range of vinyl chloride copolymers, it is of greatest value in the production of copolymers from monomer mixtures that contain about 75 to 95 percent by weight of vinyl chloride, 3 to 20 percent by weight of a vinyl ester of a lower alkanoic acid, and 0.1 to 5 percent by weight of a long chain $\alpha$-olefin. Particularly valuable terpolymers have been prepared from monomer mixtures that contain 85 to 94 percent by weight of vinyl chloride, 5 to 10 percent by weight of vinyl acetate, and 0.5 to 3 percent by weight of hexadecene-1 or octadecene-1.

The vinyl esters that may be used in the preparation of the copolymers of this invention are vinyl esters of alkanoic acids that contain from 1 to 6 carbon atoms. These include, for example, vinyl formate, vinyl acetate, vinyl propionate, vinyl butyrate, vinyl valerate, vinyl caproate, and mixtures thereof. Vinyl acetate is ordinarily preferred because of its availability and low cost.

The $\alpha$-olefins that may be used to modify the properties of the copolymers are those that contain from 10 to 22 carbon atoms, such as decene-1, dodecene-1, tetradecene-1, hexadecene-1, octadecene-1, eicosene-1, docosene-1, and mixtures thereof. Particularly good results have been obtained when hexadecene-1 or octadecene-1 was used to modify the vinyl chloride copolymer.

The copolymers of this invention may be prepared by any of the well-known emulsion or suspension polymerization procedures. For example, they may be prepared by a suspension polymerization process in which the monomers as dispersed as small droplets in water and polymerized therein. The polymerization is generally carried out at a temperature in the range of 30° C. to 70° C. in the presence of about 0.005% to 2%, based on the weight of the monomers, of a free radical generating polymerization initiator, such as lauroyl peroxide, benzoyl peroxide, diisopropylperoxy dicarbonate, tertiary butyl peroxypivalate, azobisisobutyronitrile, and the like. A small amount of suspending or dispersing agent, such as methylcellulose, gelatin, hydrolyzed polyvinyl acetate, vinyl acetate-maleic anhydride copolymers, and the like, may also be present during the polymerization. The copolymers produced may be dried by spray-, drum-, or tray-drying techniques or by any other known technique for drying polymeric materials. Common additives, such as plasticizers, pigments, fillers, heat and light stabilizers, and the like, may be added in the amounts ordinarily used for these purposes to modify the properties of the copolymers.

The novel copolymers may be used in the production of coatings, films and shaped articles by molding, extruding, calendering, solvent-casting, and other processes of treatment and fabrication commonly applied to vinyl chloride polymers. These copolymers may also be compounded or blended with other polymeric materials.

The invention is further illustrated by the examples that follow. In these examples, all parts are parts by weight and all percentages are percentages by weight.

EXAMPLE 1

A series of terpolymers was prepared by heating the following polymerization systems in a stirred autoclave at 59° C. for about 10 hours.

|  | Ex. 1A, parts | Ex. 1B, parts | Ex. 1C, parts | Ex. 1D, parts | Ex. 1E, parts | Comp. Ex. 1F, parts |
| --- | --- | --- | --- | --- | --- | --- |
| Vinyl chloride | 89.25 | 90.00 | 90.25 | 91.25 | 91.25 | 88 |
| Vinyl acetate | 9.5 | 8.75 | 7.25 | 6.25 | 6.25 | 12 |
| Octadecene-1 | 1.25 | 1.25 | 2.5 | 2.5 | | |
| Hexadecene-1 | | | | | 2.5 | |
| Water (deionized) | 187 | 187 | 187 | 187 | 187 | 187 |
| Methylcellulose-(Methocel-15) | 0.75 | 0.75 | 0.75 | 0.75 | 0.75 | 0.75 |
| Lauroyl peroxide | 0.26 | 0.26 | 0.32 | 0.34 | 0.34 | 0.125 |

The relative rates at which the monomer mixtures of Examples 1P and 1D and Comparative Example 1F polymerized is shown in the following table:

|  | Percent conversion | | |
| --- | --- | --- | --- |
|  | Ex. 1B | Ex. 1D | Comp. Ex. 1F |
| Reaction time, hours: | | | |
| 0 | 0 | 0 | 0 |
| 2 | 22.5 | 18.5 | 9.5 |
| 3 | 35.0 | 31.6 | 15.5 |
| 4 | 49.5 | 44.5 | 24.0 |
| 6 | 72.0 | 70.0 | 42.5 |
| 8 | 88.0 | 88.0 | 68.0 |
| 10 | 92.0 | 92.0 | 91.5 |

From these data it will be seen that after a short inhibition period the rates of polymerization of the systems of Examples 1B and 1D were uniform until depletion of the monomers began to influence the rate of polymerization; whereas in the absence of a long-chain α-olefin (Comp. Ex. 1F), there was a continuously accelerating rate of polymerization until depletion of the monomers affected the rate of polymerization.

EXAMPLE 2

The properties of the products of Examples 1A, 1B, 1C, 1D, and Comparative Example 1F were determined by means of standard test methods.

(A) The relative viscosities of the products were measured at 25° C. using a 1% solution of the polymer in cyclohexanone. The following results were obtained.

|  | Relative viscosity |
| --- | --- |
| Product of Example 1A | 1.90±0.02 |
| Product of Example 1B | 1.90±0.02 |
| Product of Example 1C | 1.90±0.02 |
| Product of Example 1D | 1.90±0.02 |
| Product of Comparative Example 1F | 1.90±0.02 |

(B) Measurements made with an Instron Melt Rheometer operated at 160° C. of the viscosiometric properties of the polymers at various cross-head speeds indicated that the terpolymers of this invention (the products of Examples 1A, 1B, 1C and 1D) are rheologically similar to the copolymer whose preparation is described in the Comparative Example.

(C) The heat stabilities of the products of Examples 1A and 1C and the Comparative Example 1F were determined by the folowing procedure: A mixture of 40 parts of the polymer, 4 parts of dioctyl phthalate, 1.2 parts of an organotin stabilizer (Thermolite-31), and 0.2 part of stearic acid was blended at room temperature and then milled for 5 minutes on a 2-roll mill whose roll surfaces weer maintained at 290° F. The mixtures were removed from the rolls as flexible, homogeneous sheets, 35 mils in thickness. One-inch squares which had been cut from the milled sheets were placed on clean 1/16 inch thick steel plates, covered with aluminum foil, and placed on a rotating shelf in an oven maintained at 365° F. Specimens were removed periodically from the oven, and their colors were noted. A color rating scale was adopted for the purpose of comparison of color and consequently comparison of heat stability. On this scale a rating of 0 denotes absence of color; 2, pale yellow, 5, yellow; 7, dark yellow; and 10, black. The results obtained are summarized in Table II.

TABLE II

|  | Color of specimen after indicated number of minutes at 365° F. | | | | | | | | | |
| --- | --- | --- | --- | --- | --- | --- | --- | --- | --- | --- |
|  | 0 | 10 | 20 | 30 | 40 | 50 | 60 | 70 | 80 | 90 |
| Product of Example 1A | 0 | 0 | 0 | 0 | 0 | 0 | 2 | 2 | 2 | 7 |
| Product of Example 1C | 0 | 0 | 0 | 0 | 0 | 0 | 2 | 2 | 2 | 5 |
| Product of comparative Example 1F | 0 | 0 | 2 | 2 | 2 | 2 | 2 | 5 | 7 | 10 |

From these data it will be seen that the terpolymers of this invention have substantially better heat stability than does the vinyl chloride-vinyl acetate copolymer that has similar rheological properties. Both compositions containing the novel terpolymers discolored only slightly in 60 minutes and became yellow in 90 minutes; whereas the composition containing the copolymer discolored in 20 minutes, became yellow in 70 minutes, and turned black in 90 minutes at 365° F.

The increased heat stability of the novel terpolymers makes possible the processing and use of these materials at higher temperatures than were previously possible. In addition the terpolymers have better processing characteristics since they do not degrade as rapidly as the comparable vinyl chloride copolymer. Heat-stabilized compositions containing these terpolymers are usually more economical to prepare and use than are those containing the comparable copolymer since less of the relatively expensive organotin and other stabilizers is required to achieve equivalent heat stability.

The terms and expressions which have been employed are used as terms of description and not of limitation. There is no intention in the use of such terms and expressions of excluding any equivalents of the features shown and described or portions thereof; it is to be recognized that various modifications are possible within the scope of the invention claimed.

What is claimed is:

1. A terpolymer made by polymerizing a mixture of monomeric materials comprising about 75 to 95 percent by weight of vinyl chloride, about 3 to 20 percent by weight of a vinyl ester of an alkanoic acid having 1 to 6 carbon atoms, about 0.1 to 5 percent by weight of an α-olefin having from 10 to 22 carbon atoms.

2. A terpolymer as set forth in claim 1 which is made from a monomer mixture containing 85 to 94 percent by weight of vinyl chloride, 5 to 10 percent by weight of said vinyl ester, and 0.5 to 3 percent by weight of said α-olefin.

3. A terpolymer as set forth in claim 1 wherein the vinyl ester is vinyl acetate.

4. A terpolymer as set forth in claim 1 wherein the α-olefin is hexadecene-1.

5. A terpolymer as set forth in claim 1 wherein the α-olefin is octadecene-1.

6. A terpolymer as set forth in claim 1 which is prepared from a monomer mixture containing 85 to 94 percent by weight of vinyl chloride, 5 to 10 percent by weight of vinyl acetate, and 0.5 to 3 percent by weight of octadecene-1.

References Cited

UNITED STATES PATENTS

| | | | |
|---|---|---|---|
| 3,296,230 | 1/1967 | Gateff | 260—87.1 |
| 3,370,031 | 2/1968 | Grommers | 260—29.6 |

FOREIGN PATENTS

| | | |
|---|---|---|
| 752,490 | 2/1967 | Canada. |
| 1,128,580 | 9/1968 | Great Britain. |

JOSEPH L. SCHOFER, Primary Examiner

C. A. HENDERSON, Jr., Assistant Examiner

U.S. Cl. X.R.

260—45.75, 87.1